Dec. 15, 1964  H. F. KÖNIG ETAL  3,161,148
TILTING SECTION HOPPER CAR
Filed April 20, 1961  2 Sheets-Sheet 2
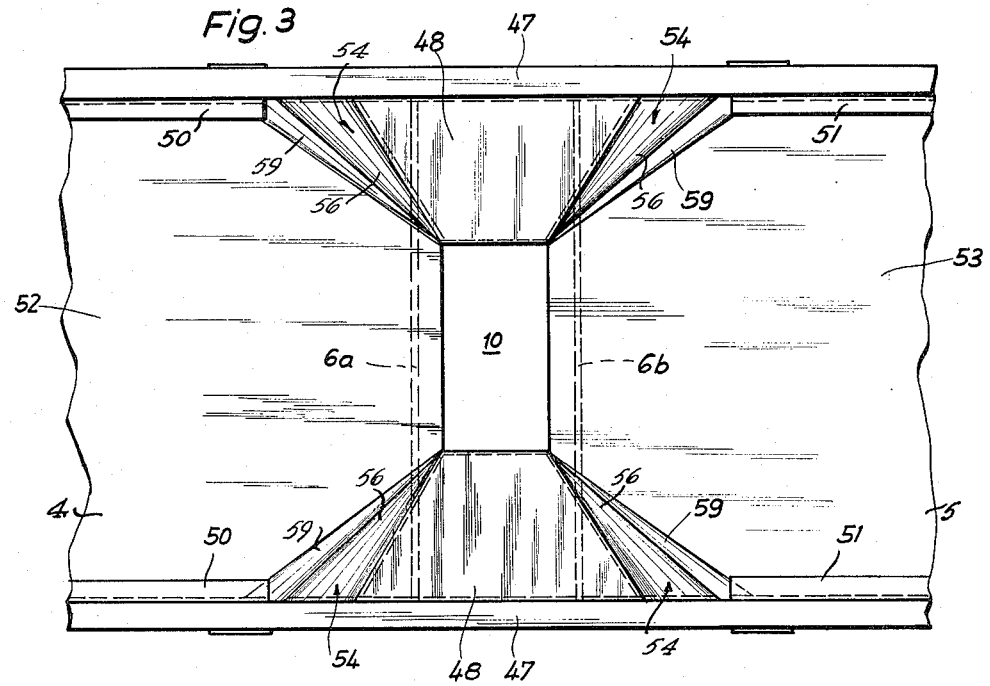
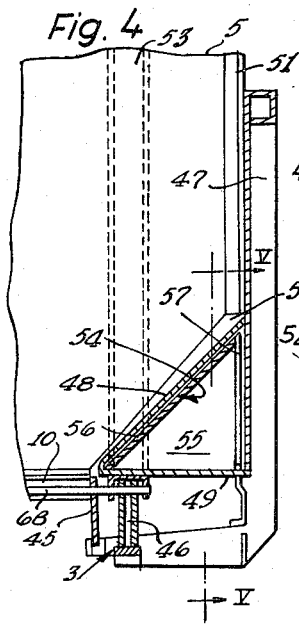
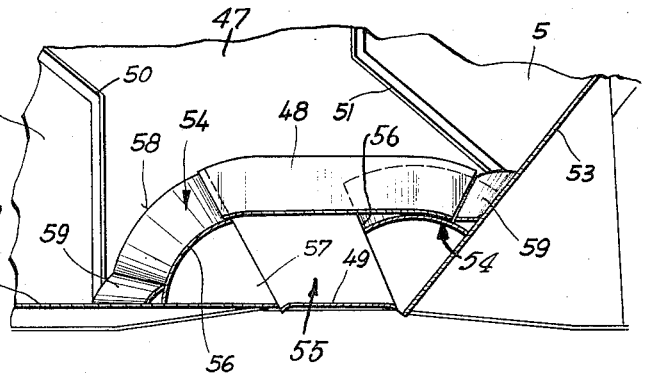
INVENTOR.
Helmut F. König
Christian J. Stiefel
BY
Patent Agent United States Patent Office 3,161,148
Patented Dec. 15, 1964

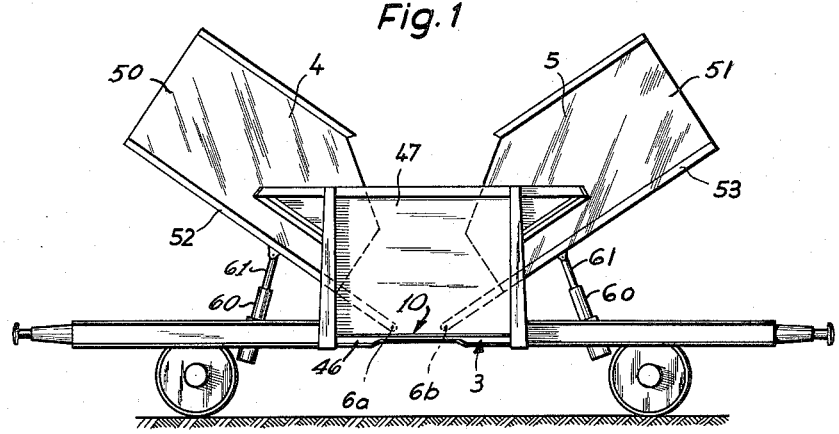
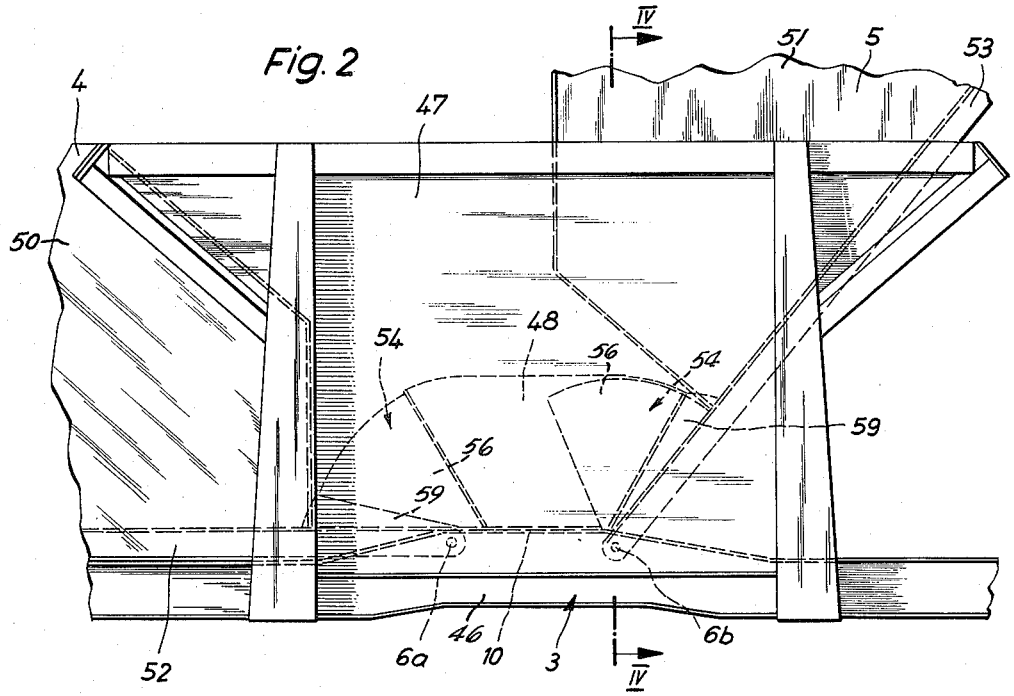

3,161,148
TILTING SECTION HOPPER CAR
Helmut F. König, Minden, Westphalia, and Christian J. Stiefel, Aachen, Germany, assignors to Waggonfabrik Talbot, Aachen, Germany
Filed Apr. 20, 1961, Ser. No. 104,439
Claims priority, application Germany, Sept. 14, 1960, W 28,565
5 Claims. (Cl. 105—262)

The present invention relates to a flat bottom, open railroad car comprising a car box divided along the central transverse plane of said box so that two box sections are formed which are tiltable about shafts extending laterally adjacent the central lateral plane of the car and mounted in the frame portion of the car. Arranged in the central portion of the car between the cover plates for the longitudinal beams in the car frame, there is provided a discharge opening defined by the lateral cover plates and the bottom of the box sections for discharging the goods from said car.

In order to be able to use freight cars of the above mentioned type also for goods other than pourable goods, the fixed central portions of the side walls may be provided with revolving or tiltable doors so as to allow discharge of goods toward the side of the freight car. If such doors are not necessary, or if the goods are to be discharged only through the central discharge opening, the heretofore known arrangement of the freight car has the drawback that some of the portable goods will stay on the fixed bottom plate between the lateral wall and the edge of the discharge opening at the natural slope or gradient, in other words, the goods in the car will not be completely discharged.

It is, therefore, an object of the present invention to provide an open freight car of the above mentioned general type, which will overcome the above outlined drawbacks.

It is another object of this invention to provide an open freight car of the above mentioned general type, in which the above outlined dead corners will be eliminated.

These and other objects and advantages of the invention will appear more clearly from the following specification in connection with the accompanying drawings, in which:

FIG. 1 illustrates a side view of a railroad freight car according to the present invention with the box sections thereof in tilted position for discharge of the car contents.

FIG. 2 is a side view of the central portion of the railroad freight car according to FIG. 1 but on a larger scale than that of FIG. 1.

FIGURE 3 is a partial top plan view of FIGURE 2.

FIG. 4 is a section taken on the line IV—IV of FIG. 2.

FIG. 5 represents a section along the line V—V of FIG. 4.

The freight car according to the present invention is characterized primarily in that the above mentioned dead corners have been covered up by inclined sliding plates which, in conformity with the sliding angle, are inclined from the stationary central side wall plate to the start of the discharge opening.

In order to create a merging portion between the tiltable box sections and the guiding plates, those ends of the box sections, which protrude beyond the lateral walls of the box sections toward the central portion of the car, are provided with lateral guiding members which cooperate with the sliding plates to assure a total discharge of the goods from the freight car. This has been materialized according to the present invention by so arranging the guiding members that they are adapted to slip behind the guiding plates and to engage the same, as well as the lateral walls of the car, in a sealing manner. The upper line of de-limitation of the guiding members is represented by an arc, the central portion of which is located on the tilting axis of the respective box sections. The guiding member itself may consist of an arched cover sheet which is connected to the tiltable box bottom and in cross section extends parallel to the guiding plate.

With a particular embodiment of applicants' invention, it has proved advantageous for assuring a complete sliding off of the goods from the car, to provide the abutting end between guiding member and bottom with an inclined cover. Similarly, webs are advantageously to be mounted below the guiding member.

Referring now to the drawing in detail, the railroad freight car shown therein comprises a frame or chassis 3 having the box sections 4 and 5 tiltably journalled thereon for tilting movement about the shafts 6a and 6b. Between these tilting shafts, there is provided a discharge opening 10 which is laterally confined by a metal sheet plate 45. Plate 45 covers up the discharge opening 10 with regard to the longitudinal beams 46 of the frame 3. In the central portion of the car, there are provided stationary side walls 47 relative to which the box sections 4 and 5 may be adjusted. Inclined guiding plates 48 are provided between the lateral edges of the discharge opening 10 and said side walls 47. The said guiding plates 48 are connected to the side walls 47 and also to one end of a bottom plate 49. The other end of the bottom plate 49 is likewise connected to one of the side walls 47. Preferably, the guiding plates 45 have an angle of inclination of approximately 45° with regard to the bottom plates 49.

The tiltable box sections 4 and 5 are provided with side walls 50 and 51 which cover up the stationary side walls 47 towards the central portion of the car, thereby assuring a closure between the box sections 50 and 51 and the stationary side walls 47 regardless of the respective position of the box sections 4 and 5. The bottoms 52 and 53 of the box sections extend up to the discharge opening 10 beyond the side walls 50 and 51 and support the bearings for the tilting shafts 6a and 6b. The said protruding ends of the bottoms of the car boxes have mounted thereon the lateral guiding members 54 which, during the tilting operation, slip behind the guiding plates 48 and prevent the loaded goods from moving into the dead chamber 55 below the guiding plates 48. The purpose of the corner plate 59 consists in enlarging the slide angle, whereas the webs 57 serve for maintaining the shape of the guiding members 54 in order to assure a snug engagement of the guiding plates 48 and the lateral walls 47.

The upper contour line 58 of the guiding members 54 is a circle the center of which is formed by the axis of the tilting shafts 6a and 6b respectively of the box sections 4 and 5. The guiding members 54 are formed primarily of a bent cover plate 56 parallel to the respective guiding plate 48. The cover plates 56 are on one hand connected to the bottom of the box section 52, 53 respectively and on the other hand along the contour line 58 to the web 57.

The box sections 4 and 5 are tilted for instance by hydraulic lifting means which are well known and illustrated in FIG. 1. These devices actually consist of pressure fluid cylinder means 60 linked to the chassis and telescopically movable rams 61 therein, which are linked to the bottom of the respective box section.

It is, of course, to be understood that the present invention is, by no means, limited to the particular constructions shown in the drawing but also comprises any modifications within the scope of the appended claims.

What we claim is:

1. In an open freight car having longitudinal beams and a substantially central discharge opening between said beams having lateral edges on the sides thereof toward said beams, said car also having centrally located substantially vertical stationary side walls: a car box subdivided in a direction transverse to the longitudinal axis of said car so as to form two box sections, one section on each side of said opening, each of said box sections having side walls terminating in spaced relation to said opening and a bottom, said bottom having a portion thereof extending beyond said last mentioned side walls in a direction toward said opening and terminating adjacent said opening, a pair of shafts supported by said longitudinal beams in the central portion of said car and engaging the said portions of said bottom for extending in transverse direction thereof and engaging the said portions of said bottom for tiltably supporting said box sections for selective tilting movement of said box sections toward each other, discharging plates located between and fixed to said stationary side walls and the respective adjacent lateral edges of said discharge opening and inclined inwardly toward said opening, and lateral guiding means fixed to and upstanding from said bottoms adjacent said discharging plates for cooperation with said discharging plates to form substantially continuous discharge surfaces leading from the box sections to said discharge opening.

2. An open freight car according to claim 1, in which the guiding means are movable behind the inclined discharging plates and sealingly engage the inclined discharging plates and stationary side walls of said car.

3. In an open freight car having longitudinal beams and a substantially central discharge opening between said beams having lateral edges on the sides thereof toward said beams, said car also having centrally located substantially vertical stationary side walls: a car box subdivided in a direction transverse to the longitudinal axis of said car so as to form two box sections, one section on each side of said opening, each of said box sections having side walls terminating in spaced relation to said opening and a bottom, said bottom having a portion thereof extending beyond said last mentioned side walls in a direction toward said opening and terminating adjacent said opening, a pair of shafts supported by said longitudinal beams in the central portion of said car and extending in transverse direction thereof and engaging said portions of said bottoms for tiltably supporting said box sections for selective tilting movement of said box sections toward each other, discharging plates located between and fixed to said stationary side walls and the respective adjacent lateral edges of said discharge opening and inclined inwardly toward said opening, and lateral guiding means fixed to and upstanding from said bottoms adjacent said discharging plates for cooperation with said discharging plates to form substantially continuous discharge surfaces leading from the box sections to said discharge opening, the said guiding means in cross section being formed as a circle having its center located on the axis of the said shaft respectively pertaining to the respective box section.

4. In an open freight car having longitudinal beams and a substantially central discharge opening between said beams having lateral edges on the sides thereof toward said beams, said car also having centrally located substantially vertical stationary side walls: a car box subdivided in a direction transverse to the longitudinal axis of said car so as to form two box sections, each of said box sections having side walls terminating in spaced relation to said opening and a bottom, said bottom having a portion thereof extending beyond said last mentioned side walls in a direction toward the other box section and terminating adjacent said opening, a pair of shafts supported by said longitudinal beams in the central portion of said car and extending in transverse direction thereof and engaging said portions of said bottoms for tiltably supporting said box sections for selective tilting movement of said box sections toward each other, discharging plates located between and fixed to said stationary side walls and the respective adjacent lateral edges of said discharge opening and inclined inwardly toward said opening, and lateral guiding means fixed to and upstanding from said bottoms adjacent said discharging plates for cooperation with said discharging plates to form substantially continuous discharge surfaces leading from the box sections to said discharge opening, each guiding means comprising a curved plate mounted on the respective bottom of the box section formed to be concentric with the said shaft pertaining to the respective box section and tapering inwardly from the side wall of the pertaining box section to the said discharge opening.

5. An open freight car according to claim 4, in which the discharging plates taper inwardly from the side walls of the car to said discharge opening and have their marginal edges positioned closely adjacent the said guiding means.

References Cited in the file of this patent

UNITED STATES PATENTS

| | | |
|---|---|---|
| 402,891 | Bennett | May 7, 1889 |
| 515,854 | Barney | Mar. 6, 1894 |
| 532,674 | Le Gore | Jan. 15, 1895 |
| 612,053 | Penn et al. | Oct. 11, 1898 |
| 725,095 | Kreutler et al. | Apr. 14, 1903 |
| 795,172 | Sasse et al. | July 18, 1905 |
| 832,538 | Dalton et al. | Oct. 2, 1906 |
| 955,875 | Hunt | Apr. 26, 1910 |
| 1,825,943 | Evans | Oct. 6, 1931 |
| 2,540,698 | States | Feb. 6, 1951 |

FOREIGN PATENTS

| | | |
|---|---|---|
| 1,228,738 | France | Mar. 14, 1960 |